Aug. 7, 1945. F. GOSSLAU ET AL Re. 22,661
AIRCRAFT ENGINE CONTROL
Original Filed April 4, 1936 2 Sheets-Sheet 1
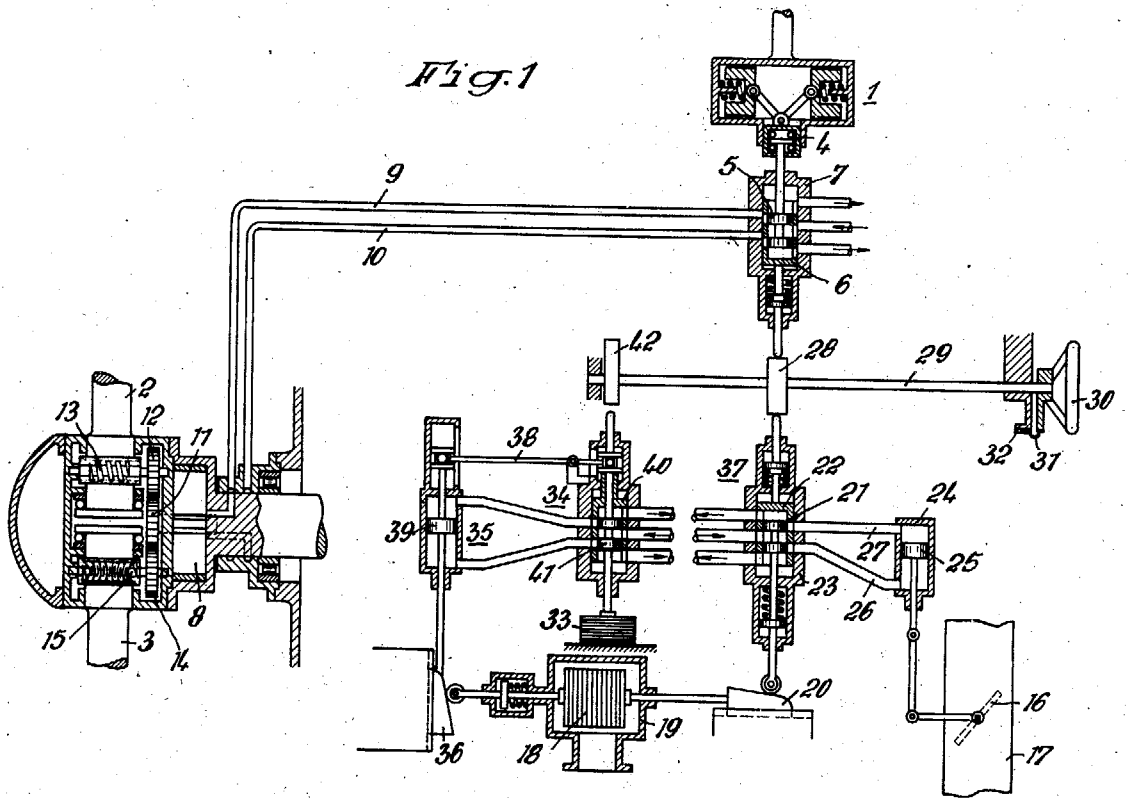
Inventors:
Fritz Gosslau
Johannes Schmidt
By:
Atty.

Aug. 7, 1945. F. GOSSLAU ET AL Re. 22,661
AIRCRAFT ENGINE CONTROL
Original Filed April 4, 1936 2 Sheets-Sheet 2
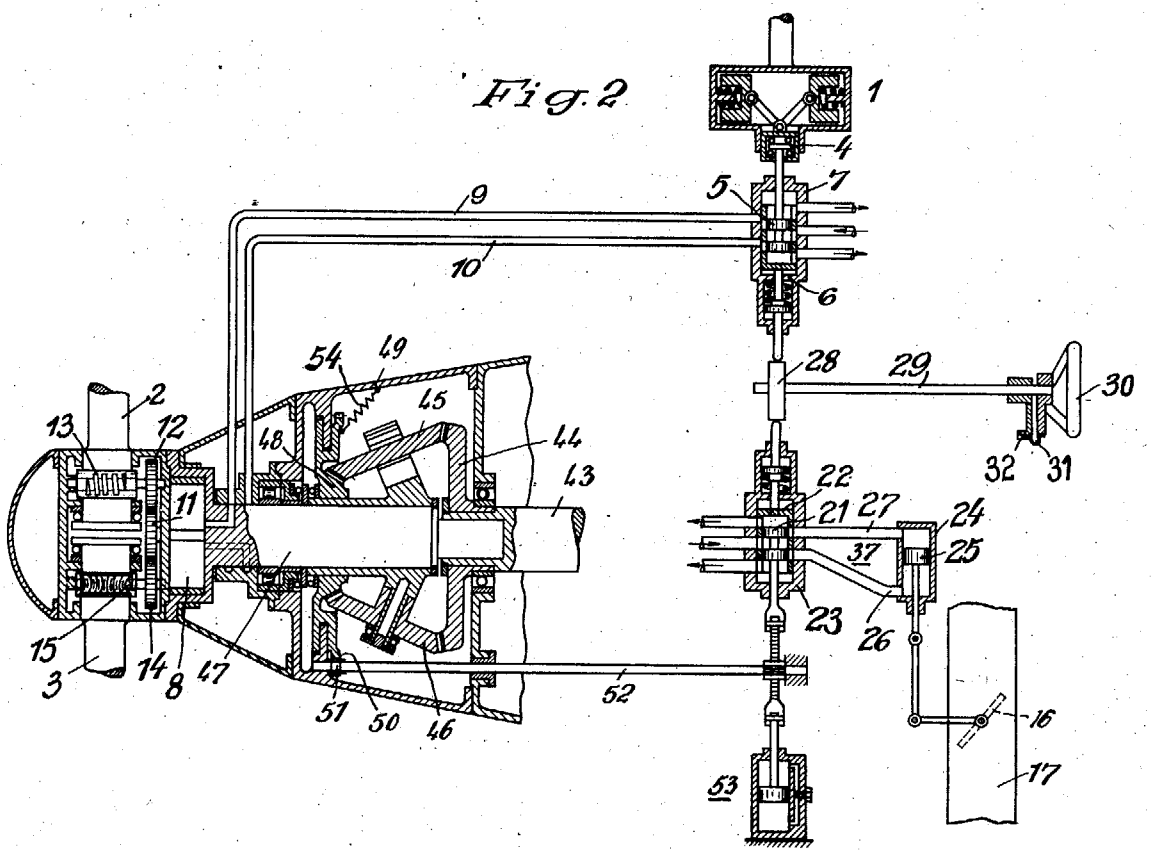
Inventors:
Fritz Gosslau
Johannes Schmidt
By: [signature]
Atty.

Reissued Aug. 7, 1945

Re. 22,661

UNITED STATES PATENT OFFICE 22,661

AIRCRAFT ENGINE CONTROL

Fritz Gosslau, Berlin - Charlottenburg, and Johannes Schmidt, Berlin-Eichkamp, Germany; vested in the Alien Property Custodian Original No. 2,187,120, dated January 16, 1940, Serial No. 72,834, April 4, 1936. Application for reissue June 5, 1940, Serial No. 339,000. In Germany April 30, 1935

9 Claims. (Cl. 170—135.6)

Our invention relates to an arrangement and means for controlling the operation of an aircraft engine.

In aircraft engines, the two factors, speed and torque, upon which the developed engine power depends, change with varying operating conditions. To what extent these two factors contribute at any instant to develop the required power depends chiefly upon the engine and the propeller characteristics. If the engine characteristic and that of the propeller are not brought into a proper relationship with each other, it may happen that the engine is exposed to danger resulting, e. g., from overload, or that it operates uneconomically. In the case of an increase in speed (R. P. M.) a mechanical overload may occur, while overheating may result from an undue increase in torque. The danger of an overload as the result of undue increase in speed occurs, for instance, in the case of an engine driving a propeller particularly adapted for the take-off, i. e., a propeller having a relatively small pitch, if the engine is required to develop the maximum power when flying at high altitudes. Overheating may be caused during the take-off if the engine is equipped with and drives a propeller particularly designed for altitude flight, i. e., a propeller having a relatively large pitch. In the first case, the engine will race due to decreased torque at high altitudes, and in the second case, it will be overloaded during take-off due to the great torque resulting from the pitch of the propeller blades.

The object of our invention is to provide an arrangement for controlling the operation and the power of an aircraft engine whereby it is possible to prevent, under all operating conditions, overstraining or overheating of the engine. This object is accomplished by employing an adjustable pitch propeller and correlating at all times the speed of the engine or the pitch of the propeller with the torque or the motive power of the engine, for example, the fuel supply, in such a manner that the torque resulting from the pitch of the propeller is always in proper relation to the speed developed by said engine and required under all flying conditions.

Practically, this control is in the simplest case accomplished by the use of a common adjusting device whereby the pitch of the propeller and the position of the throttle valve in the fuel supply of the engine are rendered variable. The operator may thus at all times adjust the required engine power and operating conditions by means of a single handle, without paying attention to speed and torque factors that must be correlated to avoid overstraining or overheating.

The power of aircraft engines is also affected by external conditions which vary in accordance with the altitude of flight. The novel control may readily be adapted to take also these conditions into account by the use of automatically operating governors, i. e., governors which automatically compensate for external influences and maintain at all times the desired operating values. Common adjusting means may be provided with these governors so as to enable the operator to adjust the power of the engine to the desired value, without paying special attention to overstraining or overheating.

The novel control may be carried out by providing a common adjusting device, e. g., a cam or the like, cooperating with sleeves of two suitable sleeve valves of hydraulic devices, one of which controls the setting of the propeller pitch and the other of which controls the fuel supply through the medium of a suitable throttle valve or the like.

The known manner of regulating the operating conditions in accordance with fuel charge pressures or density of the fuel charge is insufficient when it is desired that the control of the proper speed and torque values or motive power is maintained at all altitudes of flight. The effect of the varying altitudes on the engine operation, i. e., the varying air pressures encountered, must be taken into account, because they affect the residual gas proportion and the temperature of the fuel charges. According to the invention, this influence is compensated for by the provision of an auxiliary governor which corrects the supply of the operating fuel in accordance with the outer air pressure. This auxiliary governor is preferably made so that it may be selectively disconnected in order that the motor may be operated to develop, whenever required, the greatest possible power in accordance with the greatest permissible supercharger pressure. This may be accomplished, according to the invention, by providing mechanism for putting the auxiliary governor out of operation upon adjustment of the manual controls to certain desired maximum values. Thus, if the operator actuates the corresponding control lever provided for the power control of his engine to the end position corresponding to the maximum output, the auxiliary governor will be automatically disconnected, and the motor can then be adjusted to that value of the desired power which can be temporarily maintained at all altitudes in order to meet emergency conditions.

The control impulses for regulating the supply of the operating fuel in accordance with torque or motive power control independent of the altitude of flight are preferably derived from the fuel charge pressure or from the density of the fuel charge. However, this procedure need not be employed, since there are other ways of reaching the object of the invention, particularly if the drive of the propeller is effected by the engine through a transmission gear. According to the invention, it is proposed to employ for this purpose the supporting gear wheel, which in such a transmission does not revolve, by resiliently supporting it against a stationary part of the transmission casing or the like. The torque balance which is thus obtained is used for controlling the supply of the operating fuel to the engine.

The objects explained above and other objects and features not specifically noted are described more in detail in the following explanations rendered with reference to the accompanying drawings. In these drawings:

Fig. 1 shows a diagrammatic representation of one embodiment of the new control system; and Fig. 2 illustrates a modification with certain parts in section.

Referring now to Fig. 1, the engine speed is controlled by a speed governor 1 of generally known structure, which controls the adjustment of the two blades extending from the shafts 2 and 3 of an adjustable pitch propeller shown in part diagrammatically at the left-hand side of the drawings. The latter control is effected by transmitting the motion of the governor sleeve 4 to an auxiliary control piston 5 which slides in a movable sleeve 6 within a cylinder 7. These parts form an auxiliary control by means of which the supply to and discharge of oil under pressure from the hydraulic motor 8, similar in design to a rotary valve, is governed by way of the lines or conduits 9 and 10. An adjusting movement of the motor 8, effective to the propeller blades, is transmitted from the gear 11 through the gear 12 and the worm 13 to the propeller blades extending from the shaft 2 and through the gear 14 and worm 15 to the other propeller blade extending from the shaft 3, respectively. The actuation of the gear 11 of the hydraulic motor 8 is thus responsive to varying pressures transmitted over the pressure supply lines 9 and 10 from a suitable supply by way of the control comprising the cylinder 7 which contains the sleeve 6 and the piston 5; this control being interposed in the pressure supply lines as shown in the drawings. These pressure supply lines enter into the cylinder 7, and the sleeve 6 is provided with suitable ports. Its position with respect to the pressure lines therefore controls the flow of operating fluid in the direction of the arrows, and consequently the supply and flow of such fluid from and to the hydraulic motor 8. The position of the sleeve 6 is determined by a common control cam 28 which will be discussed presently more in detail. It will be seen, however, that the piston 5 constitutes an additional control of the flow of liquid. This piston, which, as shown, may comprise two spaced portions, is movable within the sleeve 6 and is suitably linked to the sleeve 4 of the governor 1. Any motion of this piston in response to speed variations of the engine exercises a control over the ports in the cylinder 6. Specifically, with the engine at low speed, the piston will be in its lowermost position substantially as shown in the drawings. The ports in the sleeve 6 shown adjacent the places where the supply lines 9 and 10 terminate in the cylinder are blocked. With the engine at high speed, piston 5 will be raised more or less toward its other terminal position, depending on the engine speed at any moment, and the ports in the sleeve 6 will be correspondingly opened, either partially or wholly. However, the extent to which liquid can be transmitted over the feed lines 9 and 10 obviously depends on the position of the sleeve 6 within the cylinder 7, and this position is adjustable by means of the control comprising the member 28 which may be a cam or the like secured to a suitable shaft 29 and operable from a handle or hand wheel, such as 30. The sleeve 6 thus constitutes a device for setting or adjusting the propeller pitch to a desired mean value, which is subject to modification by the governor 1 in accordance with the engine speed. It may be noted that two feed lines 9 and 10 are shown on one side of the cylinder 7, while three pressure lines are indicated on the other side. The reason is that reverse operation of the motor 8 must be provided for.

The throttle valve 16 arranged in the intake pipe 17 leading to the fuel supply of the engine is actuated by a similar hydraulic control device 37 under the control of a suitable barometric device 18, the operation of which depends on the pressure or volume of the gas enclosed therein.

The device 18 is located in a chamber 19 which may be connected to the fuel supply conduit 17. If the pressure in the conduit 17 increases or decreases, the barometric member 18 contracts or expands correspondingly, and therefore displaces the cam 20 which in turn causes displacement of the auxiliary control piston 21 movably mounted within the slide valve sleeve 22 disposed within the casing 23. The sleeve 22 constitutes a device for manually adjusting the throttle valve 16 and is controlled through the medium of cam 28 in a manner which is clearly apparent from the drawings. The motor for operating the throttle 16 is thus controlled not only by the auxiliary control piston 21 but also by the sleeve 22 and consists, in the embodiment illustrated, of a generally known structure comprising a piston 25 movably arranged in a cylinder 24. The auxiliary control 37 and the control motor 25 for the throttle valve 16 are connected with each other by means of the conduits 26 and 27. The operation is effected by any desired control meduim, such as, for instance, oil under pressure from a suitable supply connected to the cylinder or housing 23 by means of the three pipes shown at the left of cylinder 23. The three feed pipes or lines at one side of the cylinder 23 are required in this instance for the same reason as discussed in connection with the control unit 7, namely, to provide for movement of the piston 25 in both directions.

The two control devices for adjusting the desired operating values comprising the slide valve sleeves 6 and 22 for the governors 1 and 18, as above described, are under the control of a cam 28, as previously mentioned. This cam is mounted on a shaft 29 carrying a hand wheel 30 at one end thereof which may be actuated by the operator. The hand wheel 30 may, if desired, be provided with a pointer 31 so as to furnish at all times an indication on a scale 32 of at least approximately the adjusted engine power.

It will be seen from the explanations so far rendered in the foregoing, that the invention contemplates control means for variably adjusting the pitch of the propeller blades, control means for variably adjusting the throttle or fuel inlet for the engine, a common device for selectively pre-setting or adjusting said control means to selected desired values, together with means for additionally adjusting said first control means in accordance with the speed of the engine, and means for additionally or independently adjusting said second control means in accordance with pressure conditions in the fuel supply of the engine.

The influence of the varying engine power due to the fluctuations of the exhaust back pressure of the engine in response to atmospheric pressures encountered at varying altitudes of flight, is compensated for by an auxiliary governor comprising, in the embodiment shown in Fig. 1, a barometric measuring device 33, a hydraulic auxiliary control 34, and a hydraulic control motor 35 which corrects the position of the throttle valve 16 with the aid of a cam 36 which is adapted to exercise control over the pressure device 18, and thus an additional corrective control over the device 37 and the motor 24 including the piston 25.

The operation of this last noted control provision responsive to atmospheric pressures appears to be clear from the drawings without the aid of elaborate explanations. It falls broadly along the line of operating principles which also govern the previously described control devices 7 and 37. As the pressure decreases in high altitudes, the member 33 expands and moves the piston 41 within the sleeve 40. The flow of operating liquid under pressure is thus controlled for causing a corrective motion of the piston 39 and corresponding motion of the cam 36. This cam in turn effects the motion of cam 20 through the medium of the enclosed barometric device 18. Accordingly, piston 21 of the control device 37 is moved, with the result that the flow of operating fluid under pressure is correspondingly effected over the pipes 26, 27 to move the piston 25 of the throttle motor. The valve or motor 16 is thus automatically actuated to compensate for the atmospheric pressures encountered.

The auxiliary motor or governor 35 is equipped with return or resetting means comprising the lever 38 which upon movement of the piston 39 brings the sleeve 40 of the control device 34 again into the position of alignment with respect to the control piston 41. A return provision is not necessary for the governor 1 and the regulator 18 since their return is brought about by their operation as such. In the case of the device 1, it is changed speed which brings about the alignment position between the control piston 5 and the sleeve 6; and in the case of the device 37 (18), it is changed pressure in the conduit 17 which causes the proper re-alignment between the control piston 21 and the sleeve valve 22.

The previously mentioned mechanism, by means of which the auxiliary governor comprising the devices 33, 34, and 35 may be put out of operation when it is desired to adjust the engine to the maximum output, includes the cam denoted by numeral 42. This cam is mounted together with the cam 28 on the shaft 29. If the operator desires to obtain maximum power regardless of atmospheric conditions, he operates the hand wheel 30 until the cam 42 presses the control piston 41 into its lowest position, thus causing a further opening of the throttle valve 16 as a consequence of operating steps previously discussed and apparent from the drawings.

In the arrangement shown in Fig. 2, the speed is controlled in the same manner as in the arrangement according to Fig. 1, as may be seen from the placement of identical parts shown in the upper portion of the drawings. However, the control of the throttle valve 16 is in this case not effected in accordance with the air pressure, but as a function of the torque imparted to the propeller by the engine. The propeller is driven by the shaft 43 carrying the bevel gear 44 firmly mounted thereon and which rolls upon the gear 48 through the medium of bevel gears 45 and 46 carried on the shaft 47. The gear 48 is elastically or resiliently supported against the casing 49, as indicated at 54, so that the deflections of the gear 48 in one or the other direction are a measure of the torque imparted to the propeller by the engine. In other words, the gear wheel 48 operates in the manner of a torque balance. The deflections of the torque balance thus formed by the gear 48 are transmitted to the shaft 52 through the medium of the toothed connection comprising the gear 51 engaged by the teeth 50 of gear 48. The shaft 52 is thus rotated in one or the other direction according to the angular deflection of gear 48, and operates a suitable rack or the like which is connected, as shown, at one side to the piston of the control device 37 and at the other side to the plunger of a dash pot or oil brake 53. This latter prevents a hunting of the control 37 and steadies its operation. The operation of the throttle 16 is controlled, as previously discussed, by a motor governed in its action by the control device 37.

We claim as our invention:

1. In combination, an engine, fuel supply means therefor, an operating shaft driven by said engine and driving an adjustable pitch propeller, hydraulic motor means for adjusting the pitch of the blades of said propeller, hydraulic motor means for adjusting said fuel supply means, separate hydraulic pitch control and fuel control means, respectively, for controlling said motor means, common operating means for determining the setting of said hydraulic control means, and separate auxiliary means for governing the actuation of said hydraulic control means according to the speed of said engine and according to the torque of said operating shaft, respectively.

2. In an aircraft power unit having a variable pitch propeller and an internal combustion engine for driving said propeller, in combination, a device for regulating the pitch of said propeller to control the engine speed, said device containing a hydraulic motor, a device for regulating the charging pressure of said engine to control the engine torque, said latter device containing another hydraulic motor, two hydraulic valves for controlling said hydraulic motors respectively, each of said valves comprising a manually adjustable portion and a self-adjusting automatic portion, a common setting mechanism under the control of the pilot, said setting mechanism having cam means operatively connected with both said manually adjustable portions of said valves for varying the adjustment of said manually adjustable portions in a given relation to each other.

3. In an aircraft power unit having a variable pitch propeller and an internal combustion engine for driving said propeller, in combination, adjustable speed control means for varying the pitch of said propeller, said speed control means comprising a speed governor and a hydraulic transmission between said governor and said propeller, adjustable throttle means for varying the charging pressure of said engine, torque control means for actuating said throttle means so as to maintain the engine torque at a datum value, said torque control means comprising an actuating member and a hydraulic transmission between said member and said throttle means, a master control mechanism under the control of the pilot for simultaneously varying the adjustment of said speed control means and said torque control means in a given relation to each other, each of said hydraulic transmissions comprising a cylinder, fluid pressure lines ending in said cylinder, a sleeve member slidably disposed in said cylinder and a piston member slidably disposed in said sleeve member, one of said two members of each transmission being operatively connected with said master control mechanism so as to effect a kinematically constrained movement in accordance with the movement of said master control mechanism, and said other members being connected with said propeller and said pressure-adjusting throttle means respectively.

4. The combination and structure defined in claim 1, wherein a transmission gear is interposed between said engine operating shaft and said propeller including a supporting gear wheel which is substantially at rest during operation of said engine and said propeller, together with means constituting said auxiliary means for governing the actuation of said hydraulic control for adjusting the fuel supply in accordance with the torque of said operating shaft comprising, means for resiliently mounting said transmission supporting gear wheel, and means operated by said gear wheel for actuating said hydraulic fuel control means in response to alterations of the torque balance of said supporting gear wheel.

5. The combination, with an aviation engine and variable pitch propeller driven thereby, of two hydraulic motors for controlling the propeller pitch and fuel supply, respectively, two hydraulic valves for controlling said motors, respectively, means for manually setting said valves, means for automatically adjusting one valve in accordance with the engine speed, and means for automatically adjusting the other valve in accordance with the torque applied to said propeller.

6. The combination with an aircraft engine and a variable pitch propeller driven by said engine, of control means for varying the pitch of said propeller responsive to the speed of said engine, a device for supplying fuel to said engine, control means for adjusting said device responsive to changes in the torque applied to said propeller by said engine, cooperative regulating elements between said last-mentioned control means and said device, and setting means comprising a manually operated cam operatively connected with both of said control means and connected to said device through one of said regulating elements designed for simultaneously adjusting both of said control means in a given relation to each other, whereby the power output of said engine is maintained at a given value corresponding to the adjustment of said setting means, said setting means being the only mechanical connection between the two said control means.

7. The combination with an aircraft engine and a variable pitch propeller driven by said engine, of control means for varying the pitch of said propeller responsive to the speed of said engine, cooperative regulating members, one of said members connected to an engine speed responsive unit, a device for supplying fuel to said engine, control means for adjusting said device responsive to changes in the torque applied to said propeller by said engine, cooperative regulating elements between said last-mentioned control means and said device, and manually operated setting means operatively connected with said first-mentioned control means through one of said regulating members and connected to said device through one of said regulating elements designed for simultaneously adjusting both of said control means in a given relation to each other, whereby the power output of said engine is maintained at a given value corresponding to the adjustment of said setting means, said setting means being the only mechanical connection between the two said control means.

8. In an aircraft power unit having a variable pitch propeller and an internal combustion engine for driving said propeller, in combination, an adjustable speed governor for varying the pitch of said propeller in response to variations of the speed of said engine so as to maintain said speed at a datum value, a throttle valve for varying the charging pressure of the engine, regulating means for controlling said throttle valve so as to maintain the engine torque at a datum value, a master control device connected with both said speed governor and said regulating means for setting said datum values in a given relation to each other, and means operatively connected with said regulating means for selectively putting said regulating means out of operation upon adjustment of said master control device to a given maximum value for obtaining a maximum power output beyond the range of the automatic pressure control.

9. In an aircraft power unit having an internal combustion engine and a variable pitch propeller driven by the shaft of said engine, in combination, an adjustable centrifugal-type governor for controlling the engine speed disposed between said engine shaft and said propeller to vary the pitch of said propeller in dependence upon the speed of rotation of said shaft, an automatic device for controlling the engine charge in order to maintain the torque of said engine substantially constant at an adjustable value, and a master control device under the control of the pilot for simultaneously varying the adjustments of engine speed and torque required for various conditions of flight in order to maintain a desired power output, said master device being operatively connected with said governor so as to control the setting of said governor and hence of the engine speed to be maintained by said governor, said master device being also operatively connected with said charge control device for varying the setting of said control device and thereby the engine torque in a predetermined and constrained relation to the variation of the setting of said governor in accordance with said power output.

FRITZ GOSSLAU.
JOHANNES SCHMIDT.